United States Patent

Sugimoto et al.

Patent Number: 5,795,950
Date of Patent: Aug. 18, 1998

[54] STRAIGHT CHAIN CRYSTALLINE POLYURETDIONE

[75] Inventors: Kenshi Sugimoto; Shinji Suzuki; Ichiro Ibuki, all of Nobeoka, Japan

[73] Assignee: Asahi Kasei Kogyo Kabushiki Kaisha, Osaka, Japan

[21] Appl. No.: 737,772

[22] PCT Filed: Apr. 21, 1995

[86] PCT No.: PCT/JP95/00797

§ 371 Date: Nov. 18, 1996

§ 102(e) Date: Nov. 18, 1996

[87] PCT Pub. No.: WO95/32231

PCT Pub. Date: Nov. 30, 1995

[30] Foreign Application Priority Data

| May 20, 1994 | [JP] | Japan | 6-106588 |
| May 20, 1994 | [JP] | Japan | 6-106589 |
| May 24, 1994 | [JP] | Japan | 6-109850 |
| May 24, 1994 | [JP] | Japan | 6-109851 |

[51] Int. Cl.$^6$ .......................... C08G 18/74
[52] U.S. Cl. .................. 528/73; 525/124; 252/182.8; 540/202
[58] Field of Search ............... 528/73; 525/124; 252/182.2; 540/202

[56] References Cited

U.S. PATENT DOCUMENTS

| 3,923,743 | 12/1975 | Quiring et al. | 117/17 |
| 4,044,171 | 8/1977 | Muller et al. | 525/440 |
| 4,246,380 | 1/1981 | Gras et al. | 427/27 |
| 4,413,079 | 11/1983 | Disteldorf et al. | 524/169 |
| 4,463,154 | 7/1984 | Disteldorf et al. | 528/45 |
| 4,614,785 | 9/1986 | Richter et al. | 528/45 |
| 4,994,541 | 2/1991 | Dell et al. | 528/51 |
| 5,208,291 | 5/1993 | Wamprecht et al. | 525/124 |
| 5,237,058 | 8/1993 | Laas et al. | 540/202 |
| 5,508,337 | 4/1996 | Wamprecht et al. | 524/507 |

FOREIGN PATENT DOCUMENTS

| 51-98220 | 8/1976 | Japan. |
| 53-23397 | 3/1978 | Japan. |
| 6-88043 | 3/1994 | Japan. |

*Primary Examiner*—Rachel Gorr
*Attorney, Agent, or Firm*—Pennie & Edmonds LLP

[57] ABSTRACT

The present invention provides straight-chain crystalline polyuretdione which has a structure represented by formula (1):

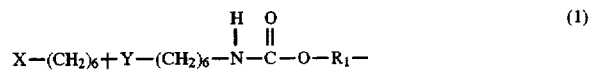

-continued $$-O-C(=O)-N-[(CH_2)_6]_n-Y-(CH_2)_6-X$$
         |
         H wherein Y represents

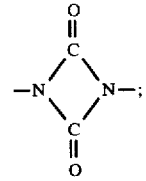

X represents

$$-N(H)-C(=O)-O-R_2-OH, \quad -N(H)-C(=O)-R_3$$

or —NCO; $R_1$ is $R_2$ or $$-R_2-O-C(=O)-N(H)-R_4-N(H)-C(=O)-O-R_2-;$$

$R_2$ is a residual group other than diol; $R_3$ is a residual group obtained by removing an active hydrogen from a compound having one active hydrogen; $R_4$ is a residual group obtained by removing two NCO groups from diisocyanate; and n is 1 or more, in formula (1), Y being replaced with a triazine ring represented by

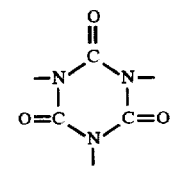

in the range of 0 to 15%, the polyuretdione having a latent NCO group content of 12 to 21% by weight, a weight-average molecular weight of 2000 to 20000 and a melting point of 60° to 140° C., and being not blocked at 40° C. or less. The straight-chain crystalline polyuretdione of the present invention can be used as a hardener for powder coatings and does not cause a bad smell due to a blocking agent during baking of coating. The enamel film obtained from a powder coating composition containing the straight-chain crystalline polyuretdione of the present invention is excellent in surface leveling, weatherability and mechanical properties.

22 Claims, 1 Drawing Sheet

FIG. 1

STRAIGHT CHAIN CRYSTALLINE POLYURETDIONE

TECHNICAL FIELD

The present invention relates to straight-chain crystalline polyuretdione mainly used as a hardener for powder coatings and to a powder coating composition which contains the straight-chain crystalline polyuretdione and which exhibits excellent surface leveling, weatherability and mechanical properties.

BACKGROUND ART

Organic solvent type coatings have problems in safety and sanitariness since they employ a large amount of organic solvents. Further, in recent years, organic solvent type coatings have gradually been avoided for use in the coating industry because of the regulation of volatile organic compounds. On the other hand, powder coating has less danger of fire, causes less environmental pollution since it can be recovered for reuse, and can form a thick film. Accordingly, improvement in the physical properties of powder coatings can be expected. A demand for a powder form of a polyurethane coating has been increasing.

Today, as a polyurethane powder coating, there is mainly used a polyurethane powder coating which is prepared by melt mixing a main component of a polyester polyol and a hardener disclosed in U.S. Pat. No. 4,246,380, formed by blocking NCO groups of a polyisocyanate obtained from isophorone diisocyanate (hereinafter referred to as "IPDI") with a blocking agent such as ε-caprolactam, at a temperature where the blocking agent does not dissociate in an extruder, followed by grinding. When the polyurethane powder coating is used, the blocking agent is dissociated during baking of the coating to cause a cross-linking reaction with the polyol. Therefore, the dissociated blocking agent may badly affect the environment and sanitation. For the purpose of avoiding this defect, there is disclosed a polyuretdione type hardener without a blocking agent but with IPDI in U.S. Pat. Nos. 4,413,079 and 4,463,154, and with tolylene diisocyanate or hexamethylene diisocyanate (hereinafter referred to as "HDI") in U.S. Pat. No. 4,044,171. In this case, the polyuretdione type hardener can be used as a hardener for powder coatings since a uretdione ring comprising 2 mol NCO groups dissociates into 2 mol NCO groups during baking of the coating to react with the polyol. Although IPDI has better weatherability than an aromatic isocyanate because it is aliphatic, the weatherability is not sufficient enough and also it has a problem in the surface leveling property. Since the hardener without a blocking agent has asymmetrical NCO groups in its chemical structure, it has a high dissociation temperature, a gel fraction which is not elevated, and defects in mechanical properties such as impact strength.

U.S. Pat. No. 4,044,171 discloses a method for preparing polyuretdione of HDI in an example. The polyuretdione is used as a hardener for a solvent type coating. Even if the polyuretdione is used as a hardener for a powder coating, it is presumable that the gel fraction is not raised and the mechanical properties such as impact resistance are reduced due to a low content of latent NCO groups. Accordingly, the polyuretdione does not satisfy the essential conditions applicable to a hardener for a powder coating.

Of precoat materials on which a powder coating is baked, a precoat material coated with a powder coating using an epoxy type resin as a hardener to harden a polyol is considerably inferior in weatherability so that its use is disadvantageously limited. When a blocking type isocyanate is used as a hardener in order to improve the weatherability, the blocking agent is dispersed during baking and badly influences the environment during coating in the same way as the solvent type coating.

The object of the present invention is to provide a powder coating composition producing a coating layer excellent in surface leveling, weatherability and mechanical properties using a novel hardener for a powder coating.

DISCLOSURE OF THE INVENTION

The present inventors have made intensive and extensive studies to solve the above problem. As a result, they have succeeded in producing a powder coating composition excellent in weatherability, surface leveling and mechanical properties by employing, as a hardener for a powder coating, a novel polyuretdione which is formed by introducing a hexamethylene group into a polyuretdione structural unit.

Namely, the present invention provides straight-chain crystalline polyuretdione which has a structure represented by formula (1):

wherein Y represents;

X represents or —NCO; $R_1$ is $R_2$ or $R_2$ is a residual group obtained by removing OH groups from a diol compound; $R_3$ is a residual group obtained by removing an active hydrogen from a compound having one active hydrogen; $R_4$ is a residual group obtained by removing two NCO groups from diisocyanate; and n is 1 or more.

in formula (1), Y being replaced with a triazine ring represented by in the range of 0 to 15% the polyuretdione having a latent NCO group content of 12 to 21% by weight, a weight-average molecular weight of 2000 to 20000 and a melting point of 60° to 140° C., and being not blocked at 40° C. or less.

Further, the present invention provides a powder coating composition containing (A) polyol having a hydroxyl value of 20 to 250 mgKOH/g and being solid at 30° C. and (B) the above straight-chain crystalline polyuretdione as a hardener for a powder coating.

The straight-chain crystalline polyuretdione of the present invention has the structure represented by formula (1). The structure of formula (1) can be confirmed by the absorption peaks ascribed to a uretdione ring, a urethane bond and a hexamethylene group, which are measured with an infrared spectrophotometry (FT-IR).

In formula (1), Y, a uretdione ring, represented by formula (2):

may be partially replaced with a triazine ring represented by the following formula (3):

The replaced part exists as a branching of the polymer.

The proportion of the triazine ring contained in the straight-chain crystalline polyuretdione is 0 to 15%, preferably 0 to 10%, based on the total amount of the triazine and uretdione rings. When the proportion of the triazine ring exceeds 15%, polymer crystals are hardly formed so that the melting point is decreased. When the branching fraction is high, the number of cross-linking points increases. As a result, the cross-linking rate at the formation of a coating layer is accelerated so that it is difficult to obtain a smooth surface of the coating layer.

The proportion of the triazine ring in the straight-chain crystalline polyuretdione of the present invention is easily measured according to $^{13}$C-NMR method. According to the measurement with $^{13}$C-NMR (FT-NMR AC-3000 QNP probe manufactured by Bruker Japan Co., Ltd.), a peak of the chemical shift ascribed to carbons of the uretdione ring represented by formula (2) appears around between 157 and 158 ppm. A peak of the chemical shift ascribed to carbons of the triazine ring represented by formula (3) appears around between 148 and 149 ppm. The proportion of the triazine rings in the straight-chain crystalline polyuretdione of the present invention can be calculated from the integrated intensities of the above two peaks.

$R_1$ in formula (1) of the present invention is a residual group obtained by removing two OH groups from a diol represented by $R_2$ or a residual group obtained by removing two OH groups at the end from a compound obtained by reacting 2 mol diol with 1 mol diisocyanate. Representative examples of $R_2$ include —$CH_2$—$CH_2$— in the case of ethylene glycol, and —$CH_2$—$CH_2$—O—$CH_2$—$CH_2$— in the case of diethylene glycol. $R_4$ is represented by a residual group obtained by removing two NCO groups from a diisocyanate, and represented by —$(CH_2)_6$— in the case of hexamethylene diisocyanate. $R_3$ is a residual group obtained by removing an active hydrogen from a compound having one active hydrogen which is representatively exemplified in the present invention. $R_3$ is represented by —$OC_2H_5$ in the case of ethanol, and by $C_5H_{10}C(O)N$— in the case of ε-caprolactam.

The content of latent NCO groups in the straight-chain crystalline polyuretdione is 12 to 21% by weight, preferably 14 to 21% by weight. When the content of the latent NCO groups is less than 12% by weight, weatherability and mechanical properties such as impact resistance of the coating layer are unpreferably inferior because the gel fraction is not increased at the formation of the coating layer. It is theoretically difficult to produce polyuretdione having the latent NCO group content of more than 21% by weight.

The content of the latent NCO groups in the present invention indicates a value obtained by converting a uretdione ring represented by formula (2) into 2 mol of NCO groups. The content of the latent NCO groups in the polyuretdione is calculated from the content of a uretdione ring. The weight-average molecular weight is 2000 to 20000, preferably 2000 to 15000. When the weight-average molecular weight is less than 2000, the content of the latent NCO groups involved in the cross-linking is reduced due to the increase in terminal groups. In order to involve NCO groups in the cross-linking, the both ends need to be NCO groups when the uretdione rings are open. However, when there are too many terminal groups unreacted with OH groups, the gel fraction is not elevated. Further, if the weight-average molecular weight exceeds 20000, melt viscosity during baking the coating becomes high and the surface leveling of the coating layer is unpreferably inferior when the polyuretdione is melt mixed with polyol and ground to obtain a coating.

The melting point of the straight-chain crystalline polyuretdione is 60° to 140° C., preferably 70° to 120° C. If the melting point is less than 60° C., powders sometimes unpreferably block each other when the polyuretdione is melt mixed with polyol and ground to be powder. If the melting point exceeds 140° C., the heat melt processing temperature must be higher than 140° C. In such a case, when the polyuretdione is mixed with polyol using an extruder and a kneader, uretdione rings open and the cross-linking occurs due to the reaction of NCO groups with OH groups and further the torque of the extruder or the kneader is considerably increased so that it is unpreferably difficult to carry out the operation.

It is necessary for the straight-chain crystalline polyuretdione not to block at 40° C. or less because powders, which are obtained by melt mixing the polyuretdione with a polyol and grinding, block each other while stored in the summer. Therefore, for preventing the blocking, the melting point of the polyuretdione should be 60° C. or more as mentioned above. In order to achieve such a melting point, a polymer having fewer side chains and being in the form of a straight chain should be employed.

The straight-chain crystalline polyuretdione can be obtained by carrying out, at 40° to 120° C., the urethane reaction of a mixture of diol and polyisocyanate containing only uretdione rings obtained from HDI or uretdione rings and triazine obtained from HDI. A compound having an active hydrogen and/or a diisocyanate may be added to the mixture of polyisocyanate and diol.

A polyisocyanate used for a raw material of the straight-chain crystalline polyuretdione may be a polyisocyanate containing only uretdione rings represented by the above formula (2), or may be a polyisocyanate containing the uretdione rings and a few amount of triazine rings represented by the above formula (3). The contents of each component are 80% by weight or more of polyuretdione rings and 20% by weight or less of triazine rings. The proportion of the triazine rings in the straight-chain crystalline polyuretdione is determined by the polyisocyanate to be used. Therefore, it is necessary to use a polyisocyanate having a content of uretdione rings of 80% by weight or more and a content of triazine rings of 20% by weight or less in order to produce the polyuretdione having a proportion of triazine rings in the straight-chain crystalline polyuretdione of 0 to 15%. The essential difference between the straight-chain crystalline polyuretdione of the present invention and the polyuretdione used in U.S. Pat. No. 4,044,171 is the contents of uretdione rings and triazine rings of the polyisocyanate. In the polyisocyanate used in U.S. Pat. No. 4,044,171, the content of triazine rings exceeds 20% by weight. By using a calibration curve, the contents of uretdione rings and triazine rings can be obtained from the height ratio of an absorption peak (1767 cm$^{-1}$) ascribed to the uretdione ring to an absorption peak (1688 cm$^{-1}$) ascribed to the triazine rings which are measured by an infrared absorption spectrum (IR) (Fourier conversion infrared spectrophotometer FT-IR-5M type manufactured by Japan Spectroscopic Co., Ltd.).

The polyisocyanate used for a raw material of the straight-chain crystalline polyuretdione is synthesized by reacting HDI at a temperature of −10° to 120° C. for a several hours in the presence of 0.01 to 1.0% by weight, based on the total amount of HDI, of at least one of reaction catalysts represented by the following structures (a), (b) and (c):

(a): $(R_2N)_{3-n}PL_n$ (b): $R_2P—PR_2$ (c): $R_2P—A—PR_2$ wherein L is —OR or R; R is an alkyl group having 1 to 8 carbon atoms and a phenyl group having 1 to 8 carbon atoms; n is an integer of 0 to 2; A is an alkylene group having 1 to 4 carbon atoms, a vinyl group having 1 to 4 carbon atoms and a phenylene group having 1 to 4 carbon atoms in a solvent having no reaction activity to an isocyanate group or in a non-solvent. At least one of the isocyanate groups of HDI is dimerized. When a prescribed conversion is achieved, the reaction is stopped by adding a catalytic poison deactivating the reactivity of the catalyst. Then, unreacted HDI is removed using, for example, a wiped film evaporator machine to obtain polyisocyanate. The removal purification of HDI must be sufficiently conducted.

Representative examples of the above reaction catalyst (a) include tris(dialkylamino)phosphine such as trisdimethyl aminophosphine, trisdiethyl aminophosphine, trisdipropyl aminophosphine, trisdibutyl aminophosphine, trisdipentyl aminophosphine and trisdihexyl aminophosphine. Representative examples of the reaction catalyst (b) include a tetraalkyl biphosphine whose alkyl group is methyl, ethyl, propyl, butyl, pentyl and hexyl, and tetraphenyl biphosphine. Representative examples of the reaction catalyst (c) include 1,2-bis(dialkylphosphine)alkylene, 1,2-bis (diphenylphosphine)alkylene, 1,2-bis(dialkylphosphine) phenylene whose alkylene group is methylene, ethylene, propylene and butylene and alkyl group is methyl, ethyl, propyl, butyl, pentyl and hexyl, and 1,2-bis (diphenylphosphine)phenylene. Particularly, trisdiethyl aminophosphine, 1,2-bis(dimethylphosphine)ethane and tetraphenyl biphosphine are preferable since they have high reactivity and high industrial availability.

The catalytic poison means a compound which deactivates the reactivity of the reaction catalysts (a), (b) and (c) to be used, for example, an alkylation agent, an acylation agent, sulfur, atmospheric oxygen, a compound releasing oxygen, sulfuric acid, phosphoric acid and alcohol. At least one of these catalytic poisons can be used in the range of 1.0 to 10.0 mol based on the residual amount of the catalyst when a reaction is stopped. The catalytic poisons are added at the time when the target composition and viscosity of the polyisocyanate is obtained. They are preferably added when conversion does not exceed 60% since unreacted HDI is easily treated.

As mentioned above, in order to use the polyuretdione as a hardener for a powder coating, the content of uretdione rings in a production raw material, i.e., polyisocyanate in the present invention, is important. In U.S. Pat. No. 4,044,171, the polyisocyanate containing uretdione rings (a dimer in the U.S. Patent) is obtained by using a tertiary phosphine having aliphatic substituent groups such as triethyl phosphine, tributyl phosphine and phenyldimethyl phosphine as a catalyst for uretdionification. When these catalysts are used, triazinification happens on a large scale as well as uretdionification. As described above, if a reaction producing triazine rings occurs, the surface of the coating layer does not become smooth since the molecular structure becomes non-straight chain, and it becomes impossible to dissociate triazine rings into NCO groups again during baking of the coating layer. Further, weatherability and mechanical properties of the coating layer become poor because of the reduction of the latent NCO group content. Accordingly, the polyisocyanate obtained with the uretdionification catalyst disclosed in U.S. Pat. No. 4,044,171 cannot produce polyuretdione marketable as a powder coating.

The polyisocyanate may be produced by adding a small amount of IPDI to HDI to be used. Since 2 mol of an isocyanate group contained in IPDI is asymmetric from the viewpoint of a chemical structure, the crystal structure of polyuretdione can be controlled by an addition amount. Therefore, IPDI can be added so that a melting point may not be 60° C. or less. The addition amount must be 20% by weight or less in HDI.

The diol used for a raw material of the straight-chain crystalline polyuretdione is employed as a chain extension agent. It includes aliphatic, alicyclic and aromatic diols. The aliphatic and alicyclic diols are particularly preferable from the viewpoint of weatherability. These diols include ethylene glycol, 1,3-propanediol, 1,2-propanediol, 2-methyl-1,3-propanediol, 1,4-butanediol, 1,3-butanediol, 1,4-pentanediol, 1,5-pentanediol, 1,6-hexanediol, 1,5-hexanediol, 1,2-hexanediol, 2,5-hexanediol, octanediol, nonanediol, decanediol, diethylene glycol, triethylene glycol, dipropylene glycol, cyclohexanediol, hydrogenated bisphenol A, cyclohexane dimethanol, phenylhydroquinone, dihydroxy naphthalene and hydroquinone.

The compound having one active hydrogen used for a raw material of the straight-chain crystalline polyuretdione is used as a molecular weight modifier. It includes aliphatic, alicyclic and aromatic mono-ol, monoamine, lactam and oxime. The aliphatic and alicyclic compounds are particularly preferred from the viewpoint of weatherability. The compounds include methanol, ethanol, propanol, butanol, amyl alcohol, pentanol, hexanol, heptanol, nonyl alcohol, cyclobutanol, cyclohexanol, phenol, benzyl alcohol, aminopropane, aminobutane, aminopentane, aminohexane, aminooctane, ε-caprolactam, δ-valerolactam, formaldehyde oxime, methyl ethyl ketooxime and cyclohexanone oxime.

The diisocyanate used for a raw material of the straight-chain crystalline polyuretdione is used as a chain extension agent to control the content of the latent NCO group. It includes aliphatic, alicyclic and aromatic diisocyanate. Particularly, hexamethylene diisocyanate, isophorone diisocyanate, 4,4'-methylene biscyclohexyl diisocyanate are preferred from the viewpoint of weatherability.

The pro portion of polyisocyanate, diol, compound having one active hydrogen and diisocyanate which are used for raw materials of the straight-chain crystalline polyuretdione is adjusted so that a molar ratio of the NCO groups to the active hydrogen groups may be 0.8 to 1.2. when the molar ratio is less than 0.8, the content of the latent NCO groups is lowered so that the weatherability and mechanical properties are not satisfied. When the molar ratio is more than 1.2, many NCO groups bond to the terminal groups of the polyuretdione. Accordingly, when the polyuretdione is melt mixed with polyol using an extruder, a kneader and the like, the cross-linking reaction of NCO groups with OH groups occurs so that melt flowability at baking is deteriorated and the resultant coating layer has poor surface leveling.

When the diol, the compound having one active hydrogen and the diisocyanate are added to the polyisocyanate, they may be added individually or in combination. They are preferably added in a small amount continuously or portionwise for preventing a sharp elevation of reaction heat. If they are added individually, the addition order does not matter. The reaction temperature is 40° to 120° C. In the reaction, chain extension occurs mainly due to urethane reaction. When the temperature is lower than 40° C., the urethane reaction proceeds slowly. When it is higher than 120° C., gelation sometimes occurs disadvantageously because of reactions other than the urethane reaction. Upon the reaction, a urethane catalyst accelerating the urethane reaction such as an organic tin type catalyst may be used.

Polyol (A) contained in the powder coating composition of the present invention includes a polyester polyol, an acryl polyol, a fluorine polyol, a polycarbonate polyol, an epoxy polyol, and a urethane polyol.

The polyester polyol includes polyester polyol resins obtained by condensation reacting at least one of dibasic carboxylic acids such as succinic acid, adipic acid, sebacic acid, dimer acid, maleic anhydride, fumaric anhydride, isophthalic acid and terephthalic acid with at lease one of polyvalent alcohols such as ethylene glycol, propylene glycol, diethylene glycol, butylene glycol, neopentyl glycol, trimethylol propane and glycerin; polycaprolactones obtained by ring opening polymerization of ε-caprolactone and polyvalent alcohols; and esters such as a castor oil of an aliphatic compound having hydroxyl groups and polyvalent alcohols.

The acrylpolyol is prepared by copolymerizing a polymeric monomer having one or more active hydrogen in a molecule with a copolymerizable monomer. Such an acrylpolyol includes acrylopolyol resins obtained by polymerizing at least one of acrylic ester having active hydrogen such as 2-hydroxyethyl acrylate, 2-hydroxypropyl acrylate, 2-hydroxybutyl acrylate; methacrylic ester having active hydrogen such as 2-hydroxyethyl methacrylate, 2-hydroxypropyl methacrylate, 2-hydroxybutyl methacrylate; and (meth)acrylic ester having polyvalent active hydrogen such as acrylic monoester or methacrylic monoester of glycerin and acrylic monoester or methacrylic monoester of trimethylol propane with at least one of acrylic esters such as methyl acrylate, ethyl acrylate, isopropyl acrylate, n-butyl acrylate and 2-ethylhexyl acrylate and methacylic ester such as methyl methacrylate, ethyl methacrylate, isopropyl methacrylate, n-butyl methacrylate, isobutyl methacrylate and n-hexyl methacrylate; if necessary, with unsaturated carboxylic acid such as acrylic acid, methacrylic acid and itaconic acid, unsaturated amid such as acrylamide, N-methylol acrylamide and diacetone acrylamide, and other polymeric monomers such as styrene, vinyl toluene, vinyl acetate and acrylonitrile.

The fluorine polyol includes fluorine polyol obtained by copolymerizing fluoroolefine or a vinyl monomer containing fluorine, and an vinyl monomer containing hydroxide, both of which are the essential components, with a vinyl monomer copolymerizable with these components.

The epoxy type polyol includes epoxy resins such as novolak type, β-methylepichlorohydrin type, cyclic oxirane type, glycidyl ether type, glycidyl ester type, glycol ether type, epoxydized aliphatic unsaturated compound type, epoxydized aliphatic ester type, polyvalent carboxylic ester type, aminoglycidyl type and resorcin type.

The polycarbonate polyol includes ones prepared according to general methods using an aromatic polyvalent alcohol such as bisphenol A and aliphatic polyvalent alcohol such as 1,6-hexane diol or alicyclic polyvalent alcohol as a raw material.

The urethane polyol includes polymers which are produced by repeating additional reaction of aromatic, aliphatic or alicyclic diisocyanate with a compound having active hydrogen, and which have urethane bonds in the polymer and OH groups on their side chains and ends.

The hydroxyl value of the polyol to be used in the present invention is 20 to 250 mgKOH/g, preferably 20 to 200 mgKOH/g. When the hydroxyl value is less than 20 mgKOH/g, stain resistance becomes poor. When the value is more than 250 mgKOH/g, weatherability becomes poor.

The polyol preferably used in the present invention has an acid value of 10 mgKOH/g or less, a glass transition temperature of 40° to 80° C. and weight-average molecular weight of 5000 to 30000.

The above-mentioned polyols can be used in combination if desired.

The amount of the straight-chain crystalline polyuretdione (B) contained in the powder coating composition of the present invention is preferably 5 to 100 parts by weight, more preferably 7 to 80 parts by weight, based on 100 parts by weight of the polyol (A). When the amount of the polyuretdione is less than 5 parts by weight, a cross-linking reaction is not sufficiently carried out so that the weatherability and mechanical properties of the resultant coating layer become poor. When the amount is more than 100 parts by weight, surplus cross-linking agents remain so that the mechanical properties and the like of the resultant coating layer are lowered.

The powder coating composition of the present invention may contain a catalyst accelerating urethane hardening (C). The amount is preferably 5 parts by weight at most, more preferably 1 to 2 parts by weight. When it is more than 5 parts by weight, the amount of the catalyst residual after the reaction becomes large to influence the weatherability of the coating layer badly.

The catalyst accelerating urethane hardening to be used is employed for the purpose of adjusting the gel fraction of the coating layer produced by baking coating. The catalyst accelerating urethane hardening includes solvent type catalysts such as organic tin type, organic zinc type, organic zirconium type, organic cadmium type and organic barium type catalysts, which are usually used for a urethane coating. Of these, the organic tin type catalyst is preferred. The organic tin type catalyst having a melting point of 100° C. or less is more preferable. When the melting point is 100° C. or less, the coating is effectively plasticized during baking the coating so that the surface of the coating layer becomes smoother. Such catalysts include butyl tin maleate type catalyst, butyl tin laurate type catalyst, dibutyl tin maleate type catalyst, dibutyl tin laurate type catalyst, dibutyl tin acetate and dibutyl tin distearate.

In addition to the above-mentioned polyol (A), straight-chain crystalline polyuretdione (B) and catalyst accelerating urethane hardening (C), the powder coating composition of the present invention may contain, according to the use, various additives used in this technical field such as a pigment, a colorant, a surface smoother, a cissing (cratering) inhibitor, an expansion inhibitor, a photo-deterioration inhibitor, a ultraviolet inhibitor, a plasticizer, an antioxidant and a salt damage inhibitor.

An example of the production and coating method of the powder coating composition of the present invention is described.

First, the above-mentioned polyol and the straight-chain crystalline polyuretdione represented by the formula (1) are mixed with the catalyst accelerating urethane hardening and the additives such as a pigment using a Henschel mixer and the like, and melt mixed at a temperature of 80° to 140° C. with an extruder, a kneader and the like. The melt mixed powder coating material is made into powders having a diameter of about 200 µm or less using a coarse grinder and a fine grinder.

The general coating method of the powder coating is an electrostatic coating with a spray gun. Coating by a fluidization dip tank, spray coater, roll coater, curtain flow coater and the like is acceptable. A uniform coating layer is formed on a material to be coated generally by baking at 160° C. or more after the powder coating composition is attached to the material to be coated. Further, it is also possible to employ an in-mold method which comprises applying the powder coating composition of the present invention to the inside of a mold, supplying a material to be coated and heating the mold to form a coating layer on the material to be coated. The powder coating composition of the present invention is also employed for raw materials of a sheet molding compound (SMC) and a bulk molding compound (BMC).

The above-mentioned material to be coated includes a metallic plate, a plastic plate, a concrete plate, a wooden plate and molded articles thereof. The metallic plate includes a stainless plate, an aluminum plate, a titan plate, a cold stretched steel plate, a galvanized steel iron, a chrome plating steel plate, an aluminum plating steel plate, nickel plating steel plate and the like. If necessary, the metallic surface is washed by alkaline degreasing and the like, or is subjected to a chemical conversion treatment to improve adhesion to the coating layer. The metallic plate may be a metallic molded article which is preliminarily prepared by a prescribed molding. If desired, the metallic surface may be preliminarily subjected to precoating. The thickness of the precoat is preferably 10 µm or less.

The plastic plate includes a thermosetting resin such as a phenol resin and FRP and a thermoplastic resin such as a polyamide, a polycarbonate.

The obtained precoat material does not cause a bad smell of blocking agents during baking a coating. The resultant coating layer is excellent in weatherability, impact resistance, chemical resistance, surface strength, surface gloss, corrosion resistance and the like. Accordingly, the pre-coating material of the present invention can be used for outer casing, doors and other parts of home electrical appliances such as a refrigerator, a washing machine, an air conditioner and a microwave, for building materials such as a net fence and a pipe fence, for road materials such as a guardrail, for automobile parts such as a wiper, coil springs and a bumper and automobile bodies, for parts and bodies of special apparatuses such as civil engineering machinery and cultivator, for office furniture such as steel furniture and a steel shelf, and for parts of electrical apparatuses such as a panel board, a switchboard, a radiator and a transformer. The pre-coating material can be used in various fields so that its use is not limited to the above.

BEST MODE FOR CARRYING OUT THE PRESENT INVENTION

Hereinafter, the present invention is concretely described by referring to the Examples, which should not limit the scope of the present invention.

(Structural Unit of Polyuretdione)

The structural unit of the polyuretdione was defined by absorption ascribed to a uretdione ring, a urethane bond and a methylene group using an infrared spectrophotometer (FT-IR).

(Proportion of Triazine Ring in Polyuretdione)

The proportion of triazine rings contained in the polyuretdione was obtained using $^{13}$C-NMR (manufactured by Bruker Japan Co., Ltd.; FT-NMR AC-3000 QNP probe) under the following conditions. The solvent was dimethylsulphoxide-$d_6$. The measurement temperature was 40° C. The standard of chemical shift was calculated from the integrated intensity of the chemical shift around 157 to 158 ppm and the integrated intensity of the chemical shift around 148 to 149 ppm which are measured with observation frequency of 75.4 MHz under the condition that tetramethyl silane was defined as 0 ppm.

(Content of Latent NCO Group in Polyuretdione)

The content of the latent NCO groups in the polyuretdione was obtained from a calibration curve prepared using an infrared spectrophotometer (FT-IR).

(Melting Point of Polyuretdione)

The melting point of the polyuretdione was measured using a differential scanning calorimeter (DSC).

(Blocking Property of Polyuretdione)

A sample was ground using a grinder and sifted with a 8 mesh sieve. 15 g of the resultant sample was put in a 40 mmø test tube and left under a load of 20 g/cm$^2$ at 40° C. for 240 hours. When the sample was taken out from the test tube, the one that easily returned to its original shape, i.e., a powder, was defined as good (○) in the blocking property and the one that was hard to return to its original shape was defined as poor (X) in the blocking property.

(Weight-Average Molecular Weight of Polyuretdione)

The weight-average molecular weight of polyuretdione was measured using a gel permeation chromatography (GPC-RI detector) after the sample was dissolved in tetrahydrofuran.

11

(Content of NCO Group in Polyisocyanate)

The content of NCO groups in polyisocyanate was measured in percent by weight by adding surplus di-n-butylamine to react it with isocyanate groups and conversely titrating the amount of unreacted amine with hydrochloric acid.

(Content of Polyisocyanate Containing Uretdione Ring and Polyisocyanate Containing Triazine Ring in Polyisocyanate)

By using a calibration curve, the contents of a polyisocyanate containing a uretdione ring and a polyisocyanate containing a triazine ring in a polyisocyanate were obtained from the height ratio of a uretdione ring peak (1767 cm$^{-1}$) to a triazine ring peak (1688 cm$^{-1}$) which were obtained by FT-IR.

(Physical Properties of Coating Layer)

The resultant coating composition was ground using a hammer mill for fine grinding and sifted with a 100 mesh sieve. A steel plate treated with phosphate zinc was electrostaticly coated with the sifted coating composition and baked at 180° C. for 20 minutes to measure the physical properties of a coating layer.

(Surface Leveling of Coating Layer)

The surface leveling of a coating layer was expressed by a gloss value at 20° measured with a varied-angle glossmeter.

(Impact Resistance of Coating Layer)

The impact resistance of a coating layer was measured using a Du Pont type impact testing machine under the conditions that the weight was 1 kg and the diameter of a shock mould was ½ inch φ. It was expressed in the maximum height (cm) where the coating layer was not broken.

(Weatherability Test)

The weatherability test was carried out using a sunshine weathermeter, and expressed in a gloss retention (%) by dividing the gloss value at 60° after the coating layer was left for 250 hours with that before the test.

(Gel Fraction)

The gel fraction was obtained as a percentage (%) by dividing the value obtained by subtracting the weight of titanium oxide pigment from the weight obtained by immersing a baked coated plate in acetone at 20° C. for 24 hours and drying it at 100° C. for 1 hour with the value obtained by subtracting the weight of titanium oxide from the original weight of the plate.

<Synthetic Example 1>

500 g of HDI was fed in a four-necked flask equipped with an agitator, a thermometer and a cooling tube, to which 5.0 g of trisdiethyl aminophosphine was added at 60° C. while agitating, and the reaction was progressed at 60° C. 4 hours later, the content of polyisocyanate and refractive index of the reaction liquid were measured. At the time when conversion to polyisocyanate reached 18%, the reaction was stopped by adding 4.0 g of phosphoric acid. In a few minutes after the addition of phosphoric acid, deactivated catalysts were precipitated in the form of crystals. The reaction liquid was further heated at 60° C. for 1 hour and cooled down to normal temperature.

After the precipitation were removed by filtration, the unreacted HDI was removed using a flow-down type wiped coating layer evaporator firstly at 0.3 tor. and 155° C. and secondly at 0.2 tor. and 145° C.

The resultant product was a yellowish transparent liquid and had a viscosity of 52 mPa.s at 25° C. and an isocyanate group content of 24%. In the produced polyisocyanate, the uretdione ring content was 96% by weight and the triazine ring content was 4% by weight.

12

<Synthetic Example 2>

500 g of HDI was fed in the same apparatus as in Synthetic Example 1, to which 1.1 g of trisdimethyl aminophosphine and 0.2 g of tetraphenyl biphosphine were added at 80° C. while agitating, and the reaction was progressed at 80° C. 4 hours later, the content of polyisocyanate and the refractive index of the reaction liquid were measured. At the time when the conversion to polyisocyanate reached 15%, the reaction was stopped by adding 1.5 g of phosphoric acid. The reaction liquid was further heated at 80° C. for 1 hour and cooled down to normal temperature. Then, purification was carried out in the same manner as in Synthetic Example 1.

The resultant product was a yellowish transparent liquid and had a viscosity of 52 mPa.s at 25° C. and an isocyanate group content of 24%. In the produced polyisocyanate, the uretdione ring content was 91% by weight and the triazine ring content was 9% by weight.

<Synthetic Example 3>

500 g of HDI was fed in the same apparatus as in Synthetic Example 1, to which 0.8 g of 1,2-bis(dimethylphosphine)ethane was added at 25° C. while agitating, and the reaction was progressed at 25° C. 3 hours later, the content of polyisocyanate and the refractive index of the reaction liquid were measured. At the time when the conversion to polyisocyanate reached 21%, the reaction was stopped by adding 0.6 g of chloride acetate and 2.4 g of phosphoric acid. The reaction liquid was further heated at 80° C. for 1 hour and cooled down to normal temperature. Then, purification was carried out in the same manner as in Synthetic Example 1.

The resultant product was a yellowish transparent liquid and had a viscosity of 53 mPa.s at 25° C. and an isocyanate group content of 24%. In the produced polyisocyanate, the uretdione ring content was 91% by weight and the triazine ring content was 9% by weight.

<Comparative Synthetic Example 1>

500 g of HDI was fed in the same apparatus as in Synthetic Example 1, to which 2.7 g of tributyl phosphine was added at 60° C. while agitating, and the reaction was progressed at 60° C. 4 hours later, the content of polyisocyanate and the refractive index of the reaction liquid were measured. At the time when the conversion to polyisocyanate reached 17%, the reaction was stopped by adding 0.3 g of sulfur. The reaction liquid was further heated at 80° C. for 1 hour and cooled down to normal temperature. Then, purification was carried out in the same manner as in Synthetic Example 1.

The resultant product was a yellowish transparent liquid and had an NCO content of 24.5%. In the produced polyisocyanate, the uretdione ring content was 75% by weight and the triazine ring content was 25% by weight.

<Example 1>

Figure 1:
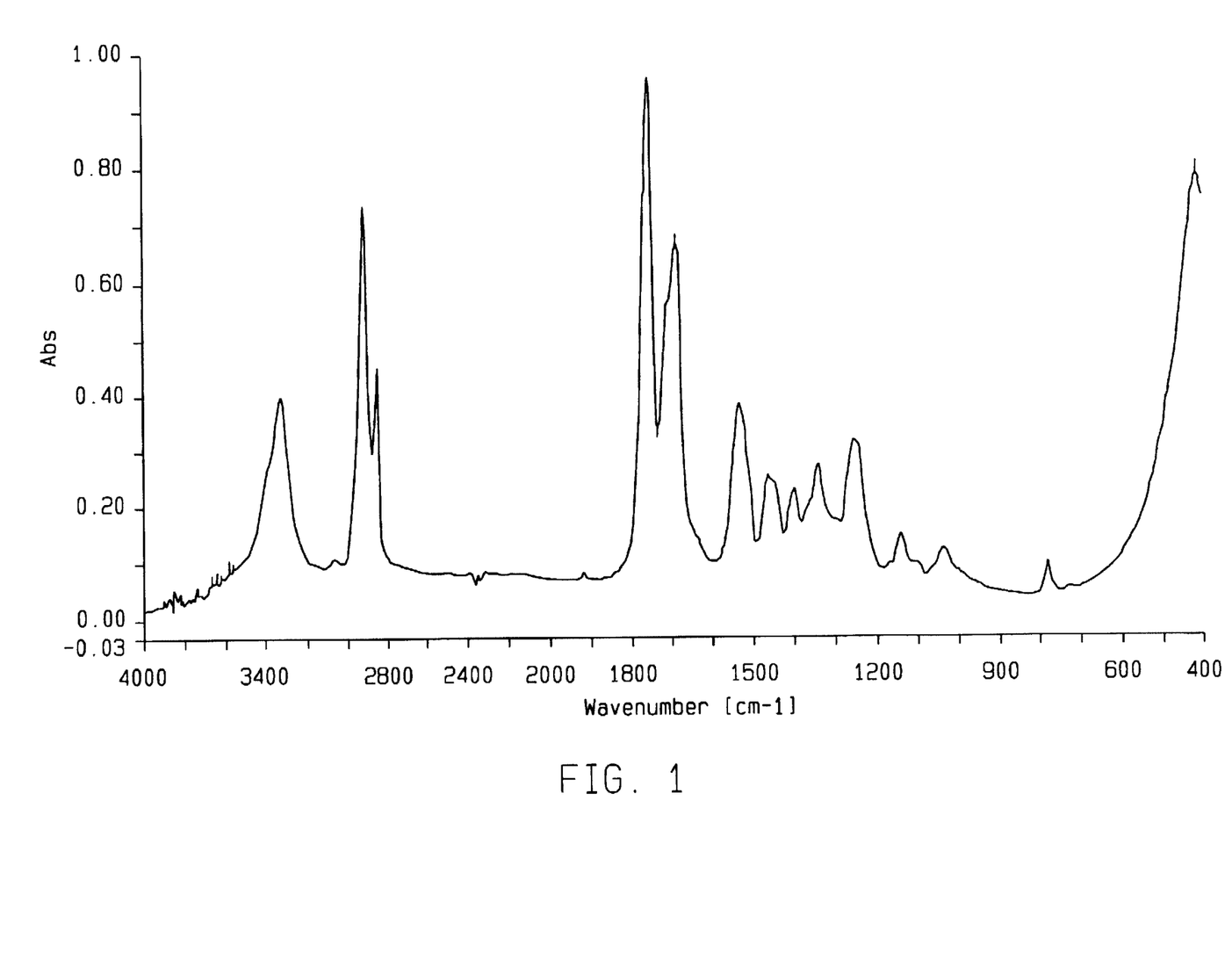
FIG. 1 is a chart of FT-IR of the polyuretdione obtained in Example 1.

5.0 mol of the polyisocyanate obtained in Synthetic Example 2 was fed in a four-necked flask equipped with agitating elements. While maintaining a temperature at 80° C., 4.0 mol of ethylene glycol was added portionwise so as to adjust the molar ratio of NCO groups to OH groups to 1.0 (1 mol of polyisocyanate had 2 mol of the NCO group) and the temperature to 100° C. or lower. Then, 2.0 mol of ethanol was added portionwise as well as ethylene glycol. The agitation was continued for 1 hour. The resultant product was put in a beaker made of polypropylene without cooling and then cooled down to room temperature. When the thus-obtained polymer was ground to examine its structure with FT-IR, it was found that the polymer exhibited absorption ascribed to polyuretdione, that is, absorption ascribed to uretdione rings, urethane bonds and methylene groups at 1760 cm$^{-1}$, 1700 cm$^{-1}$ and 2850 cm$^{-1}$, respectively. The chart of FT-IR is shown in FIG. 1. According to the NMR method, the resultant polyuretdione had a triazine ring proportion of 6%, a latent NCO group content of 18.3%, a weight-average molecular weight of 2100, a melting point of 89° C. and a good (○) blocking property.

21 parts by weight of the above-obtained polyuretdione, 36 parts by weight of titanium oxide, 0.5 part of Modaflow powder (manufactured by Monsanto Co.) and 0.3 part of dibutyl tin dilaurate were mixed with 100 parts by weight of acryl polyol having a hydroxyl value of 53 mgKOH/g and a glass transition temperature of 73° C. The mixture was initially blended with a Henschel mixer and subsequently melt mixed at 120° C. using a twin-screw extruder. The extruded melt was cooled with a pinch roller at 10° C. to obtain a powder coating composition. The resultant powder coating composition was ground using a coarse grinder and a fine grinder, and sifted with a 100 mesh sieve. The sifted powder was applied to a steel plate treated with zinc phosphate using a spray gun type electrostatic coating device and baked to measure physical properties of the resultant coating layer. The coating layer had a gloss value at 20° of 80, impact resistance of 50 cm, gloss retention of 85% and a gel fraction of 91%; it had excellent physical properties.

<Example 2>

9 parts by weight of the polyuretdione obtained in Example 1, 33 parts by weight of titanium oxide, 0.5 part of Modaflow powder, 0.3 part of dibutyl tin dilaurate were mixed with 100 parts by weight of a polyester polyol having a hydroxyl value of 23 mgKOH/g and a glass transition temperature of 54° C. The mixture was initially blended with a Henschel mixer and subsequently melt mixed at 100° C. using a twin-screw extruder. The extruded melt was cooled with a pinch roller at 10° C. to obtain a powder coating composition. The resultant powder coating was ground with a coarse grinder and a fine grinder and sifted with a 100 mesh sieve. The sifted powder was applied to a steel plate treated with zinc phosphate using a spray gun type electrostatic coating device and baked to measure physical properties of the resultant coating layer. The coating layer had a gloss value at 20° of 80, impact resistance of 50 cm,. gloss retention of 83% and a gel fraction of 90%; it had excellent physical properties.

<Example 3>

72 parts by weight of the polyuretdione obtained in Example 1, 52 parts by weight of titanium oxide, 0.5 part of Modaflow powder, 0.3 part of dibutyl tin dilaurate were mixed with 100 parts by weight of polyester polyol having a hydroxyl value of 188 mgKOH/g and a glass transition temperature of 54° C. The mixture was initially blended with a Henschel mixer and subsequently melt mixed at 120° C. using a twin-screw extruder. The extruded melt was cooled with a pinch roller at 10° C. to obtain a powder coating composition. The resultant powder coating was ground with a coarse grinder and a fine grinder and sifted with a 100 mesh sieve. The sifted powder was applied to a steel plate treated with zinc phosphate using a spray gun type electrostatic coating device and baked to measure physical properties of the resultant coating layer. The coating layer had a gloss value at 20° of 81, impact resistance of 50 cm, gloss retention of 85% and a gel fraction of 90%; it had excellent physical properties.

<Example 4>

5.0 mol of the polyisocyanate obtained in Synthetic Example 1 was fed in a four-necked flask equipped with agitating elements. While maintaining a temperature at 80° C., 4.0 mol of cyclohexane dimethanol was added portionwise so as to adjust the molar ratio of NCO groups to OH groups to 1.0 (1 mol of polyisocyanate had two mol of the NCO group) and the temperature to 100° C. or lower. Then, 2.0 mol of ethanol was added portionwise as well as cyclohexane dimethanol. The agitation was continued for 1 hour. The resultant product was put in a beaker made of polypropylene without cooling and cooled down to room temperature. When the thus-obtained polymer was ground to examine its structure with FT-IR, it was found that the polymer exhibited absorption ascribed to polyuretdione. According to the NMR method, the resultant polyuretdione had a triazine ring proportion of 3%, a latent NCO group content of 16.7%, a weight-average molecular weight of 6600, a melting point of 105° C. and a good (○) blocking property.

31 parts by weight of the above-obtained polyuretdione, 39 parts by weight of titanium oxide, 0.5 part of Modaflow powder and 0.3 part of dibutyl tin dilaurate were mixed with 100 parts by weight of an acryl polyol having a hydroxyl value of 53 mgKOH/g and a glass transition temperature of 74° C. The mixture was initially blended with a Henschel mixer and subsequently melt mixed at 120° C. using a twin-screw extruder. The extruded melt was cooled with a pinch roller at 10° C. to obtain a powder coating composition. The resultant powder coating composition was ground using a coarse grinder and a fine grinder, and sifted with a 100 mesh sieve. The sifted powder was applied to a steel plate treated with zinc phosphate using a spray gun type electrostatic coating device and baked to measure physical properties of the resultant coating layer. The coating layer had a gloss value at 20° of 82, impact resistance of 50 cm, gloss retention of 88% and a gel fraction of 90%; the physical properties were excellent.

<Example 5>

24 parts by weight of the polyuretdione obtained in Example 4, 37 parts by weight of titanium oxide, 0.5 part of Modaflow powder, 0.3 part of dibutyl tin dilaurate were mixed with 100 parts by weight of a polyester polyol having a hydroxyl value of 40 mgKOH/g and a glass transition temperature of 59° C. The mixture was initially blended with a Henschel mixer and subsequently melt mixed at 120° C. using a twin-screw extruder. The extruded melt was cooled with a pinch roller at 10° C. to obtain a powder coating composition. The resultant powder coating was ground with a coarse grinder and a fine grinder and sifted with a 100 mesh sieve. The sifted powder was applied to a steel plate treated with zinc phosphate using a spray gun type electrostatic coating device and baked to measure physical properties of the resultant coating layer. The coating layer had a gloss value at 20° of 82, impact resistance of 50 cm, gloss retention of 85% and a gel fraction of 90%; the physical properties were excellent.

<Example 6>

5.0 mol of the polyisocyanate obtained in Synthetic Example 3 was fed in a four-necked flask equipped with agitating elements. While maintaining a-temperature at 80° C., 4.0 mol of ethylene glycol was added portionwise so as to adjust the molar ratio of NCO groups to OH groups to 1.0 (1 mol of polyisocyanate had two mol of the NCO group) and the temperature to 100° C. or lower. Then, 2.0 mol of 2-hydroxy ethanol was added portionwise as well as ethylene glycol. The agitation was continued for 1 hour. The resultant product was put in a beaker made of polypropylene without cooling and cooled down to room temperature. When the thus-obtained polymer was ground to examine its structure with FT-IR, it was found that the polymer exhibited absorption ascribed to polyuretdione. According to the NMR method, the resultant polyuretdione had a triazine ring proportion of 6%, a latent NCO group content of 18.3%, a weight-average molecular weight of 2100, a melting point of 87° C. and a good (○)blocking property.

16 parts by weight of the above-obtained polyuretdione, 35 parts by weight of titanium oxide, 0.5 part of Modaflow powder and 0.3 part of dibutyl tin dilaurate were mixed with 10 parts by weight of a polyester polyol having a hydroxyl value of 40 mgKOH/g and a glass transition temperature of 59° C. The mixture was primarily blended with a Henschel mixer and subsequently melt mixed at 130° C. using a twin-screw extruder. The extruded melt was cooled with a 10° C. pinch roller to obtain a powder coating composition. The resultant powder coating composition was ground using a coarse grinder and a fine grinder, and sifted with a 10 mesh sieve. The sifted powder was applied to a steel plate treated with zinc phosphate using a spray gun type electrostatic coating device and baked to measure physical properties of the resultant coating layer. The coating layer had a gloss value at 20° of 80, impact resistance of 50 cm, gloss retention of 82% and a gel fraction of 90%; the physical properties were excellent.

<Examples 7 to 12>

A polyuretdione was synthesized with the components as shown in Table 1 using the polyisocyanate obtained in Synthetic Example 1 according to the same manner as in Example 4. When each structure of the resultant polymers was examined with FT-IR, absorption ascribed to polyuretdione was observed. The triazine ring proportion, the latent NCO group content, the weight-average molecular weight, the melting point and the blocking property of the polyuretdione measured by the NMR method are shown in Table 1.

16 parts by weight of the polyuretdione obtained in Examples 7 to 10, 35 parts by weight of titanium oxide, 0.5 part of Modaflow powder, 0.3 part of dibutyl tin dilaurate were mixed with 10 parts by weight of a polyester polyol having a hydroxyl value of 40 mgKOH/g and a glass transition temperature of 59° C. The mixture was initially blended with a Henschel mixer and subsequently melt mixed at 120° C. using a twin-screw extruder. The extruded melt was cooled with a pinch roller at 10° C. to obtain a powder coating composition. The resultant powder coating was ground with a coarse grinder and a fine grinder and sifted with a 10 mesh sieve. The sifted powder was applied to a steel plate treated with zinc phosphate using a spray gun type electrostatic coating device and baked to measure physical propertied of the resultant coating layer. The results are shown in Table 1. The resultant coating layers had excellent physical properties.

<Example 13>

500 g of HDI and IPDI in a weight ratio of 8 to 2 was fed in a four-necked flask equipped with an agitator, a thermometer and a cooling tube, to which 5.0 g of tridiethyl aminophosphine was added at 60° C. while agitating, and the reaction was progressed at 60° C. 4 hours later, the content of polyisocyanate and refractive index of the reaction liquid was measured. At the time when conversion to polyisocyanate reached 18%, the reaction was stopped by adding 4.0 g of phosphoric acid. In a few minutes after the addition of the phosphoric acid, deactivated catalysts were precipitated in the form of crystals. The reaction liquid was further heated at 60° C. for 1 hour and cooled down to normal temperature.

After the precipitates were removed by filtration, the unreacted HDI was removed firstly at 0.3 tor. and 155° C. and secondly at 0.2 tor. and 145° C. using a flow down type thin coating layer evaporator.

The resultant product was a yellowish transparent liquid and had a viscosity of 52 mPa.s at 25° C. and isocyanate group content of 24%. In the produced polyisocyanate, the uretdione ring content was 91% by weight and the triazine ring content was 9% by weight. When the content ratio of HDI to IPDI in the polyisocyanate was measured by FT-IR, it was 9 to 1 in weight.

3.0 mol of polyisocyanate obtained in the above synthesis was fed in a four-necked flask equipped with agitating elements. While maintaining a temperature at 80° C., 2.8 mol of ethylene glycol was added portionwise so as to adjust the molar ratio of NCO groups to OH groups to 1.0 (1 mol of polyisocyanate had two mol of the NCO group) and the temperature to 100° C. or lower. Then, 0.4 mol of ethanol was added portionwise as well as ethylene glycol. The agitation was continued for 1 hour. The resultant product was put in a beaker made of polypropylene without cooling and cooled down to room temperature. When the thus-obtained polymer was ground to examine its structure with FT-IR, it was found that the polymer exhibited absorption ascribed to polyuretdione. According to the NMR method, the resultant polyuretdione had a triazine ring proportion of 6%, a latent NCO group content of 17.8%, a weight-average molecular weight of 4500, a melting point,of 78° C. and a good (○)blocking property.

21 parts by weight of the above-obtained polyuretdione, 36 parts by weight of titanium oxide, 0.5 part of Modaflow powder and 0.3 part of dibutylotin dilaurates were mixed with 100 parts by weight of an acryl polyol having a hydroxyl value of 53 mgKOH/g and a glass transition temperature of 73° C. The mixture was initially blended with a Henschel mixer and subsequently melt mixed at 120° C. using a twin-screw extruder. The extruded melt was cooled with a pinch roller at 10° C. to obtain a powder coating composition. The resultant powder coating composition was ground using a coarse grinder and a fine grinder, and sifted with a 100 mesh sieve. The sifted powder was applied to a steel plate treated with zinc phosphate using a spray gun type electrostatic coating device and baked to measure physical properties of the resultant coating layer. The coating layer had a gloss value at 20° of 82, impact resistance of 50 cm, gloss retention of 85% and a gel fraction of 91%; the physical properties were excellent.

<Example 14>

24 parts by weight of the polyuretdione obtained in Example 4, 37 parts by weight of titanium oxide, 0.5 part of Modaflow powder and 0.3 part of dibutyl tin dilaurate were mixed with 100 parts by weight of a fluorine polyol having a hydroxyl value of 40 mgKOH/g. The mixture was initially blended with a Henschel mixer and subsequently melt mixed at 120° C. using a twin-screw extruder. The extruded melt was cooled with a pinch roller at 10° C. to obtain a powder coating composition. The resultant powder coating composition was ground using a coarse grinder and a fine grinder, and sifted with a 100 mesh sieve. The sifted powder was applied to a steel plate treated with zinc phosphate using a spray gun type electrostatic coating device and baked to measure physical properties of the resultant coating layer. The coating layer had a gloss value at 20° of 78, impact resistance of 50 cm, gloss retention of 85% and a gel fraction of 91%; the physical properties were excellent.

<Example 15>

18 parts by weight of the polyuretdione obtained in Example 1, 35 parts by weight of titanium oxide, 0.5 part of Modaflow powder and 0.3 part of dibutyl tin dilaurate were mixed with 100 parts by weight of a polyurethane polyol having a hydroxyl value of 42 mgKOH/g. The mixture was initially blended with a Henschel mixer and subsequently melt mixed at 120° C. using a twin-screw extruder. The extruded melt was cooled with a pinch roller at 10° C. to obtain a powder coating composition. The resultant powder coating composition was ground using a coarse grinder and a fine grinder, and sifted with a 100 mesh sieve. The sifted powder was applied to a steel plate treated with zinc phosphate using a spray gun type electrostatic coating device and baked to measure physical properties of the resultant coating layer. The coating layer had a gloss value at 20° of 81, impact resistance of 50 cm, gloss retention of 88% and a gel fraction of 93%; the physical properties were excellent.

<Example 16>

16 parts by weight of the polyuretdione obtained in Example 1, 35 parts by weight of titanium oxide, 0.5 part of Modaflow powder and 0.3 part of dibutyl tin dilaurate were mixed with 10 parts by weight of a fluorine polyol having a hydroxyl value of 40 mgKOH/g. The mixture was initially blended with a Henschel mixer and subsequently melt mixed at 120° C. using a kneader. The kneaded melt was cooled with a pinch roller at 10° C. to obtain a powder coating composition. The resultant powder coating composition was ground using a coarse grinder and a fine grinder, and sifted with a 100 mesh sieve. The sifted powder was charged into a fluidized-dipping tank to bring the powder in a fluid state. The surface of a FRP molded sheet which was preliminarily preheated in a supplemental oven was coated by passing through the fluidization dip tank to measure physical properties of the baked coating layer. The coating layer had a gloss value at 20° of 83 and gloss retention of 85%; the physical properties were excellent.

<Comparative Example 1>

Using the polyisocyanate obtained in Comparative Synthetic Example 1, a polyuretdione was prepared according to the same manner as in Example 4. The resultant polyuretdione had a triazine ring proportion of 18%, a latent NCO group content of 13.2%. A weight-average molecular weight could not be measured since the polyuretdione was insoluble in tetrahydrofuran. Accordingly, the polyuretdione did not have a melting point peak and the blocking property was poor (X).

19 parts by weight of the polyuretdione obtained in Comparative Synthetic Example 1, 36 parts by weight of titanium oxide, 0.5 part of Modaflow powder and 0.3 part of dibutyl tin dilaurate were mixed with 100 parts by weight of polyester polyol having a hydroxyl value of 40 mgKOH/g and a glass transition temperature of 59° C. The mixture was initially blended with a Henschel mixer and subsequently melt mixed at 120° C. using a twin-screw extruder. The extruded melt was cooled with a pinch roller at 10° C. to obtain a powder coating composition. The resultant powder coating composition was ground using a coarse grinder and a fine grinder, and sifted with a 100 mesh sieve. The sifted powder was applied to a steel plate treated with zinc phosphate using a spray gun type electrostatic coating device and baked to measure physical properties of the resultant coating layer. The coating layer had a gloss value at 20° of 24, impact resistance of 30 cm, gloss retention of 62% and a gel fraction of 80%.

Industrial Applicability

The straight-chain crystalline polyuretdione of the present invention can be used as a hardener for powder coatings and does not cause a bad smell due to a blocking agent when baked. The coating layer obtained from a powder coating composition containing the straight-chain crystalline polyuretdione of the present invention has excellent surface leveling, weatherability and mechanical properties. Therefore, it is suit is suitable for coatings for home electrical appliance, building materials, automobile parts, office furniture and electrical apparatus parts.

TABLE 1

| Example PIC composition to be used | | Example 7 | Example 8 Ud ring content = 96 wt. % | Example 9 | Example 10 | Example 11 Ta ring content = 4 wt. % | Example 12 |
|---|---|---|---|---|---|---|---|
| Molar ratio of charged composition | PIC | 3.0 | 5.0 | 5.0 | 3.0 | 4.2 | 4.9 |
| | EG | 2.9 | | | 2.8 | 4.0 | 4.0 |
| | 1,4-BD | | 4.0 | | | | |
| | DEG | | | 4.0 | | | |
| | EtOH | 0.2 | | 2.0 | | 2.0 | 2.0 |
| | CHOH | | 2.0 | | 0.4 | | |
| | IPDI | | | | | 0.8 | 0.1 |
| PUd property | Ta proportion (%) | 3 | 3 | 3 | 3 | 3 | 3 |
| | Latent NCO content (%) | 19.5 | 17.5 | 17.8 | 19.1 | 17.0 | 19.0 |
| | Weight-average molecular weight | 12000 | 2200 | 2200 | 6000 | 4000 | 3700 |
| | Melting point (°C.) | 100 | 124 | 70 | 97 | 85 | 88 |
| | Blocking property | ○ | ○ | ○ | ○ | ○ | ○ |
| Physical property of | Gloss value at 20° | 80 | 81 | 82 | 80 | 83 | 82 |
| | Impact resistance | 50 | 50 | 50 | 50 | 50 | 50 |

TABLE 1-continued

| Example PIC composition to be used | | Example 7 | Example 8 | Example 9 | Example 10 | Example 11 | Example 12 |
|---|---|---|---|---|---|---|---|
| | | Ud ring content = 96 wt. % | | | Ta ring content = 4 wt. % | | |
| coating layer | (cm) | | | | | | |
| | Gloss retention (%) | 83 | 85 | 84 | 83 | 88 | 86 |
| | Gel fraction (%) | 91 | 91 | 91 | 91 | 90 | 90 |

PIC: polyisocyanate
Ud: uretdione
Ta: triazine
EG: ethylene glycol
1,4-BD: 1,4-butane diol
DEG: diethylene glycol
EtOH: ethanol
CHOH: cyclohexanol
IPDI: isophorone diisocyanate
PUd: polyuretdione

We claim:

1. Straight-chain crystalline polyuretdione which has a structure represented by formula (1):

wherein Y represents

X represents or —NCO; $R_1$ is $R_2$ or $R_2$ is a residual group obtained by removing OH groups from a diol compound; $R_3$ is a residual group obtained by removing an active hydrogen from a compound having one active hydrogen; $R_4$ is a residual group obtained by removing two NCO groups from diisocyanate; and n is 1 or more, in formula (1), Y being replaced with a triazine ring represented by in the range of 0 to 15%, the polyuretdione having a latent NCO group content of 12 to 21% by weight, a weight-average molecular weight of 2000 to 2000 and a melting point of 60° to 140° C., and is able to flow as a powder at or lower than 40° C.

2. The straight-chain crystalline polyuretdione according to claim 1, wherein the proportion of triazine ring is 1 to 10%.

3. The straight-chain crystalline polyuretdione according to claim 1, wherein the latent NCO group content is 14 to 21% by weight.

4. The straight-chain crystalline polyuretdione according to claim 1, wherein the weight-average molecular weight is 2000 to 15000.

5. The straight-chain crystalline polyuretdione according to claim 1, wherein the melting point is 70° to 120° C.

6. A method for preparing straight-chain crystalline polyuretdione comprising subjecting a polyisocyanate having a uretdione ring content of 80% by weight or more and a triazine ring content of 20% by weight or less which is obtained from hexamethylene diisocyanate to a urethane reaction with diol, a mixture of diol and a compound having one active hydrogen, a mixture of diol and diisocyanate or a mixture of diol, a compound having one active hydrogen and diisocyanate under the condition of a temperature of 40° to 120° C. so that a molar ratio of NCO groups to active hydrogen groups may be 0.8 to 1.2.

7. The method for preparing straight-chain crystalline polyuretdione according to claim 6, wherein the polyisocyanate is obtained by dimerizing at least one of the isocyanate groups of hexamethylene diisocyanate at a reaction temperature of −10° to 120° C. in the presence of at least one reaction catalyst represented by the following structures (a), (b) and (c):

(a): $(R_2N)_{3-n}PL_n$
(b): $R_2P—PR_2$
(c): $R_2P—A—PR_2$ wherein L is —OR or R; R is an alkyl group having 1 to 8 carbon atoms or a phenyl group; n is an integer of 0 to 2; A is an alkylene group having 1 to 4 carbon atoms, a vinylene group or a phenylene group; stopping the reaction by a catalyst poison; and removing unreacted hexamethylene diisocyanate by distillation.

8. The method for preparing straight-chain crystalline polyuretdione according to claim 6, wherein the diol is selected from aliphatic and alicyclic diols.

9. The method for preparing the straight-chain crystalline polyuretdione according to claim 6, wherein the compound having one active hydrogen is selected from aliphatic and alicyclic monools, monoamines, lactams or oximes.

10. The method for preparing the straight-chain crystalline polyuretdione according to claim 6, wherein the diisocyanate is hexamethylene diisocyanate, isophorone diisocyanate or 4,4'-methylene biscyclohexyl isocyanate.

11. The method for preparing the straight-chain crystalline polyuretdione according to claim 7, wherein the reaction catalyst is at least one selected from the group consisting of trisdiethyl aminophosphine, 1,2-bis (dimethylphosphine)ethane, tetraphenyl biphosphine.

12. A powder coating composition containing (A) a polyol having a hydroxyl value of 20 to 250 mg KOH/g and being solid at 30° C. and (B) straight-chain crystalline polyuretdione which has a structure represented by formula (1):

wherein Y represents;

X represents or —NCO; $R_1$ is $R_2$ or $R_2$ is a residual group obtained by removing OH groups from a diol compound; $R_3$ is a residual group obtained by removing an active hydrogen from a compound having one active hydrogen; $R_4$ is a residual group obtained by removing two NCO groups from diisocyanate; and n is 1 or more, in formula (1), Y being replaced with a triazine ring represented by in the range of 0 to 15%, the polyuretdione having a latent NCO group content of 12 to 21% by weight, a weight-average molecular weight of 2000 to 2000 and a melting point of 60° to 140° C., and is able to flow as a powder at or lower than 40° C.

13. The powder coating composition according to claim 12, wherein 5 to 100 parts by weight of straight-chain crystalline polyuretdione (B) is contained based on 100 parts by weight of polyol (A).

14. The powder coating composition according to claim 12, wherein 7 to 80 parts by weight of straight-chain crystalline polyuretdione (B) is contained based on 100 parts by weight of polyol (A).

15. The powder coating composition according to claim 13, wherein 5 parts by weight or less of a urethane hardening accelerating catalyst (C) is contained based on 100 parts by weight of polyol (A).

16. The powder coating composition according to claim 14, wherein 0.1 to 2 parts by weight of a urethane hardening accelerating catalyst (C) is contained based on 100 parts by weight of polyol (A).

17. The powder coating composition according to claim 12, wherein the particle diameter is 20 μm or less.

18. The powder coating composition according to claim 16, wherein polyol (A) is at least one selected from the group consisting of a polyester polyol, an acryl polyol, a fluorine polyol, a polycarbonate polyol, an epoxy polyol and a urethane polyol.

19. The powder coating composition according to claim 16, wherein the urethane hardening accelerating catalyst is an organic tin type catalyst having a melting point of 100° C. or less.

20. The powder coating composition according to claim 16, wherein polyol (A) has an acid value of 10 mg KOH/g or less, a glass transition temperature of 40° to 80° C., and a weight-average molecular weight of 5000 to 30000.

21. The powder coating composition according to claim 12, wherein polyol (A) is at least one selected from the group consisting of a polyester polyol, an acryl polyol, a fluorine polyol, a polycarbonate polyol, an epoxy polyol and a urethane polyol.

22. The powder coating composition according to claim 12, wherein polyol (A) has an acid value of 10 mg KOH/g or less, a glass transition temperature of 40° to 80° C., and a weight-average molecular weight of 5000 to 30000.

* * * * *

UNITED STATES PATENT AND TRADEMARK OFFICE
CERTIFICATE OF CORRECTION

PATENT NO. : 5,795,950
DATED : August 18, 1998
INVENTOR(S) : SUGIMOTO et al.

It is certified that error appears in the above-identified patent and that said Letters Patent is hereby corrected as shown below:

In column 3, line 10, "15%" should be changed to --15%,--.

In column 3, lines 13 and 17, "°C." should be changed to --°C--.

In column 4, lines 47, 48, 51, 60 and 64, "°C." should be changed to --°C--.

In column 5, lines 2 and 38, "°C." should be changed to --°C--.

In column 6, line 50, "°C." should be changed to --°C--.

In column 7, line 17, "pro portion" should be changed to --proportion--.

In column 7, lines 39 and 40, "°C." should be changed to --°C--.

In column 8, line 45, "°C." should be changed to --°C--.

In column 9, lines 9, 10, 32 and 41, "°C." should be changed to --°C--.

In column 10, line 57, "°C." should be changed to --°C--.

In column 11, line 20, 42, 49, 57 and 61, "°C." should be changed to --°C--.

In column 11, line 64, "mPa.s" should be changed to --mPa·s--.

In column 12, lines 6, 12, 16, 24, 31, 35, 44, 48, 62 and 65, "°C." should be changed to --°C--.

In column 12, line 9, "werc," should be changed to --were--.

In column 12, lines 16 and 35, "mPa.s" should be changed to --mPa·s--.

In column 13, lines 12, 20, 21, 41, 43, 61 and 63, "°C." should be changed to --°C--.

UNITED STATES PATENT AND TRADEMARK OFFICE
CERTIFICATE OF CORRECTION

PATENT NO.  : 5,795,950
DATED       : August 18, 1998
INVENTOR(S) : Sugimoto et al.

It is certified that error appears in the above-identified patent and that said Letters Patent is hereby corrected as shown below:

In column 14, lines 10, 13, 24, 33, 35, 52 and 54, "°C." should be changed to --°C--.

In column 15, line 1, "a-temperature" should be changed to --a temperature--.

In column 15, lines 2, 5, 16, 23, 25, 54 and 55, "°C." should be changed to --°C--.

In column 16, lines 2, 10, 13, 14, 17, 25, 29, 39, 48 and 50, "°C." should be changed to --°C--.

In column 16, line 17, "mPa.s" should be changed to --mPa·s--.

In column 17, lines 1, 2, 20, 21, 40 and 41, "°C." should be changed to --°C--.

In column 18, lines 24 and 25, "°C." should be changed to --°C--.

In column 18, line 45, "suit is suitable" should be changed to --suitable--.

In column 20, line 30, "to 2000" should be changed to --to 20000--.

In column 20, lines 31, 53 and 59, "°C." should be changed to --°C--.

UNITED STATES PATENT AND TRADEMARK OFFICE
CERTIFICATE OF CORRECTION

PATENT NO. : 5,795,950
DATED : August 18, 1998
INVENTOR(S) : Sugimoto et al.

It is certified that error appears in the above-identified patent and that said Letters Patent is hereby corrected as shown below:

In column 21, line 23, "°C." should be changed to --°C--.

In column 22, line 14, "to 2000" should be changed to --to 20000--.

In column 22, lines 15, 46 and 55, "°C." should be changed to --°C--.

In column 22, line 34, "20 μm" should be changed to --200 μm--.

Signed and Sealed this

Eighteenth Day of May, 1999

Q. TODD DICKINSON

*Attest:*

*Attesting Officer*  Acting Commissioner of Patents and Trademarks